O. GAVELEK.
CARBURETER.
APPLICATION FILED JUNE 1, 1915.

1,239,173.

Patented Sept. 4, 1917.
6 SHEETS—SHEET 1.

Witnesses:
Robert H. Weir

Inventor:
Oscar Gavelek

UNITED STATES PATENT OFFICE.

OSCAR GAVELEK, OF CHICAGO, ILLINOIS.

CARBURETER.

1,239,173.  Specification of Letters Patent.  Patented Sept. 4, 1917.

Application filed June 1, 1915. Serial No. 31,552.

*To all whom it may concern:*

Be it known that I, OSCAR GAVELEK, citizen of the United States, residing at Chicago, in the county of Cook and State of Illinois, have invented certain new and useful Improvements in Carbureters for Internal-Combustion Motors; and I do hereby declare the following to be a full, clear, and exact description of the invention, such as will enable others skilled in the art to which it appertains to make and use the same.

This invention relates to improvements in carbureters for internal combustion engines and has for its object to provide a device of this character which possesses a number of advantageous features and attains objects as follows:

The main object of the invention is to provide a carbureter of the class described in which the main adjustments for the supply of the hydro-carbon liquid to the carbureting chamber are maintained constant, and in which the regulation for starting and traveling at varying speeds is accomplished independently of the main adjusting means by the manipulation of levers.

A further object of the invention is to provide a carbureter which is adapted to be connected with sources of supply of hydrocarbon liquids of different specific gravity either of which may at the will of the operator be supplied for purposes of carburation while the motor is in operation, and in which the regulating means are readily manipulated in a very simple manner to effect the change from one liquid to another without in any way affecting the main adjustments of the device.

A further object of the invention is to provide a carbureter in which flooding is rendered substantially impossible except at the will of the operator, and in which such flooding does not cause the filling of the float chamber to greater than maximum level, but increases the level of the liquid contiguous to the point of feed to the carbureting chamber whereby the maximum feed to the latter is provided, and may be relieved at will to the normal conditions without effecting a superabundance of supply of the hydro-carbon liquid to the float chamber of the device.

A further object of the invention is to provide an auxiliary air valve which is regulated by the operator for varying conditions, and which is not dependent upon the adjustment of a spring for maintaining the proper relative proportions of air and hydro-carbon liquid supplies to the carbureting chamber.

A further object of the invention is to provide means whereby a supply of carbureted air may be provided for starting the motor while the auxiliary air valve is closed.

A further object of the invention is to provide means for projecting hot products of combustion contiguous to a hydro-carbon liquid containing passage of the carbureter for the purpose of heating such liquid to promote evaporation thereof.

Other objects of the invention will appear from the following specification.

Suitable embodiments of the invention are illustrated in the accompanying drawings in which:

Figure —1— is a view in side elevation of a carbureter constructed in accordance with the invention.

Fig. —2— is a vertical transverse section of the same on the line 2—2 of Fig. —1—

Fig. —3— is a vertical longitudinal section of the same on the line 3—3 of Fig. —2—.

Fig. —4— is a horizontal section of the same on the line 4—4 of Fig. —1—.

Fig. —5— is a detail horizontal section on the line 5—5 of Figs. —2— and —4—.

Fig. —6— is a detail horizontal section on the line 6—6 of Fig. —3—.

Fig. —7— is a horizontal section on the line 7—7 of Figs. —1— and —3—.

Fig. —8— is a horizontal section on the line 8—8 of Fig. —3—.

Fig. —9— is a fragmentary detail horizontal section on the line 9—9 of Fig. —3—.

Fig. —10— is a detail horizontal section on the line 10—10 of Fig. —2—.

Fig. —11— is a detail view in elevation of a cam employed for manually manipulating the auxiliary air valve and which co-acts with the cam shown in Fig. —10—.

Fig. —12— is a view similar to Fig. —3— showing the device in its embodiment for the use of only one hydro-carbon liquid.

Figure 3:
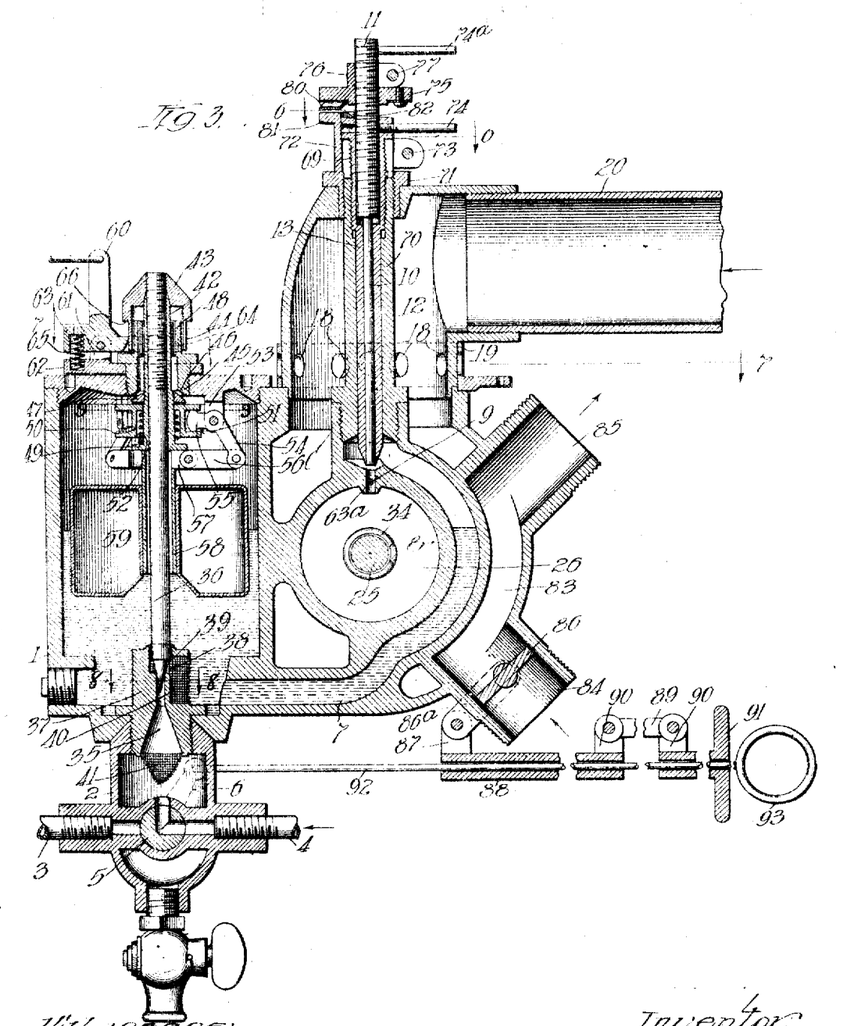
Figures 4, 10:
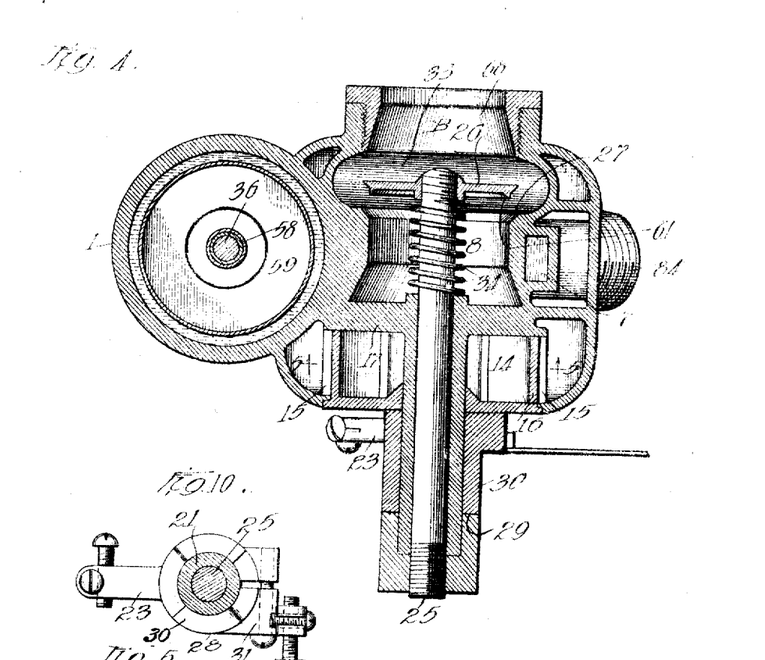

The carbureter comprises a supply chamber or float chamber 1 which is connected by means of a downwardly extending projecting portion 2 with a source of supply of gasolene, for example, by means of the horizontal branch 3 and with a supply of kerosene, for example, by means of a horizontal branch 4, the said portion or chamber 2 having internally threaded flanges to receive supply pipes. Both said branches are, as shown in Fig. —3—, controlled by a two-way valve 5, the stem of which is equipped with a lever 6 for manipulating the same to cause either of said supply pipes to communicate with the said chamber 2. From the float chamber a passage or duct 7 for the hydro-carbon liquid extends substantially half way around the horizontally disposed cylindrical carbureting chamber 8 the latter provided with an inlet port 9 for the hydro-carbon liquid in its upper portion and substantially midway between its ends. The said port 9 is controlled by a valve 10. The stem 11 of said valve 10 extends through a hollow valve stem 13 having a tapered lower end portion meeting the circumferential surface of the valve stem 11 when said hollow valve stem 13 is in its upper position for maintaining the port 9 open to the fullest extent permitted by the valve 10 when the liquid of higher specific gravity, such as kerosene, is employed for carbureting purposes.

Figure 5:
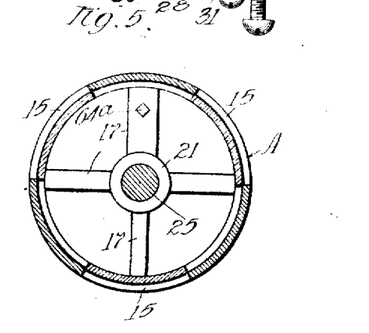

The carbureting chamber 8 communicates at one end with an air chamber 14 which is cylindrical and is provided in its circumferential wall with a plurality of air inlet openings 15 controlled by means of a rotatable cylindrical valve 16 having similar openings which are adapted to communicate with the openings 15 when said valve 16 is turned through any desired arc from the position shown in Fig. —5— to admit air in large or small quantities to the said carbureting chamber 8. The said air chamber 14 communicates freely with the carbureting chamber and may be said to constitute a part thereof; there being merely some radical spokes 17 interposed between said chamber 14 and the chamber 8. The said chamber 14 receives its supply of air from the chamber 12, the circumferential wall of which is provided with a plurality of openings 18 controlled by a valve 19 having similar openings and adapted to register with the latter to permit the maximum supply of air to the said chamber 12. The said chamber 12 further communicates with an air supply pipe 20 at its upper end through which the main supply is at all times received. This said supply pipe 20 may, if desired, be connected with a part surrounding or disposed contiguous to a wall of the exhaust manifold so that the admitted air to be carbureted may be warmed or heated in a well-known manner, heating of such air being necessary in using a heavier hydro-carbon such as kerosene.

The said air valve 16 is equipped with a head 21 having a radial arm 22 by means of which it may be turned to open or close the air inlet opening 15, said arm being adapted to engage a stop 23 disposed as in its path, and which determines its closed position; said air valve being further provided with a stop formation 24 adapted to engage said stop 23 for limiting the opening movement of said valve.

Mounted upon the said spokes 17 is a tube 21 which extends concentric with the wall of the air chamber 14 and passes through a central opening in the outer wall of the air valve 16 and is adapted to receive the stem 25 of the throttle valve 26. The latter is adapted to seat on the valve seat 27 at the opposite end of said carbureting chamber 8; said valve-stem 25 projecting from both ends of said tube 21 and being threaded at its outer end to receive the collar 28 having diametrically oppositely disposed helical cam surfaces 29. Mounted upon the said tube 21 is a tube 30 which is split and is adapted to be contracted to hold same rigid with said tube, and which carries the said stop 23 and a similar stop 31, the latter being disposed in the path of the lever 32 which is rigid with the cam collar 28 mounted on the valve stem 25, and which is adapted to be rotated to cause said air valve to be opened and closed. A compression spring 34 is interposed between the inner end of the tube 21 and the opposed hub-portion of the valve 26 and serves to maintain said valve normally open, the latter being closed against the action of said spring by rotating the said cam collar 28 relatively to the said tube 30, which is equipped with helical cam surfaces engaged by the cam surfaces 29. The valve 26 is adapted to be automatically closed against the action of said spring 34 in the event of back-fire in the intake manifold.

The carbureting chamber 8 is adapted to communicate through the chamber 33 with the intake manifold of the motor.

Having thus described in a general way the main parts of the carbureter I will now proceed to describe the same with regard to the details of construction whereby the various objects aforesaid are attained.

Figures 6, 7, 8, 9:
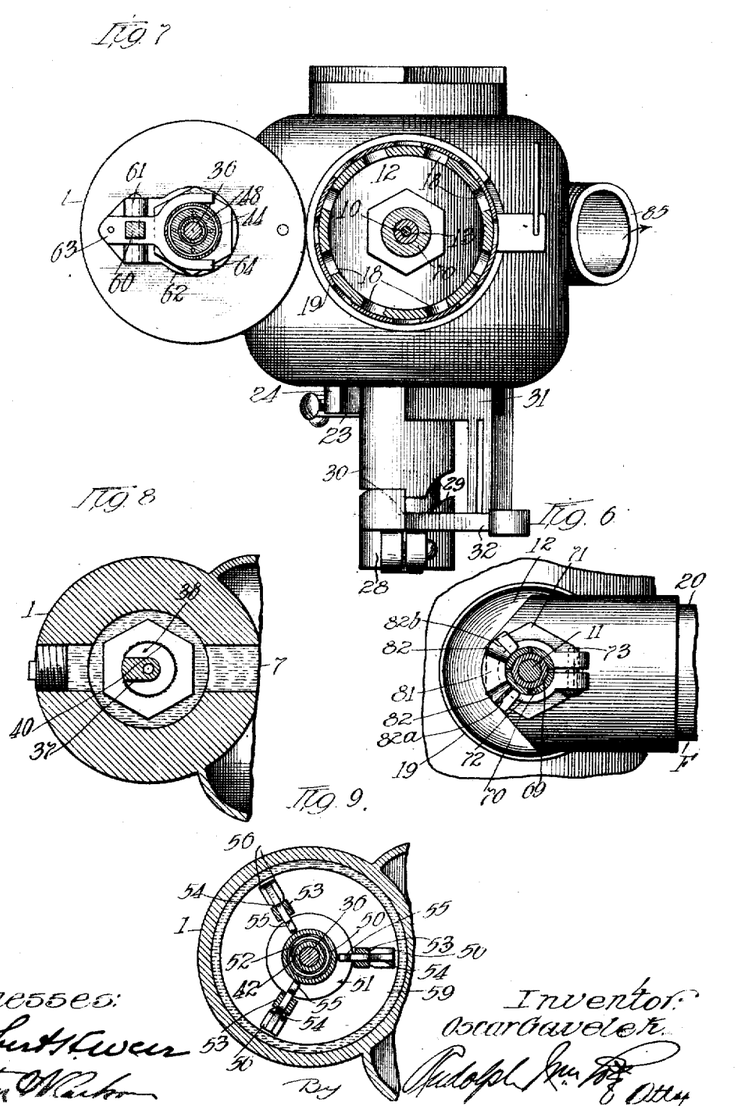
Figure 11:
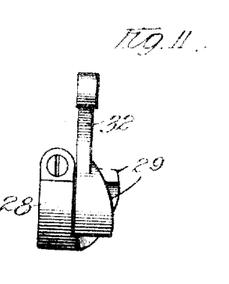
Figure 12:
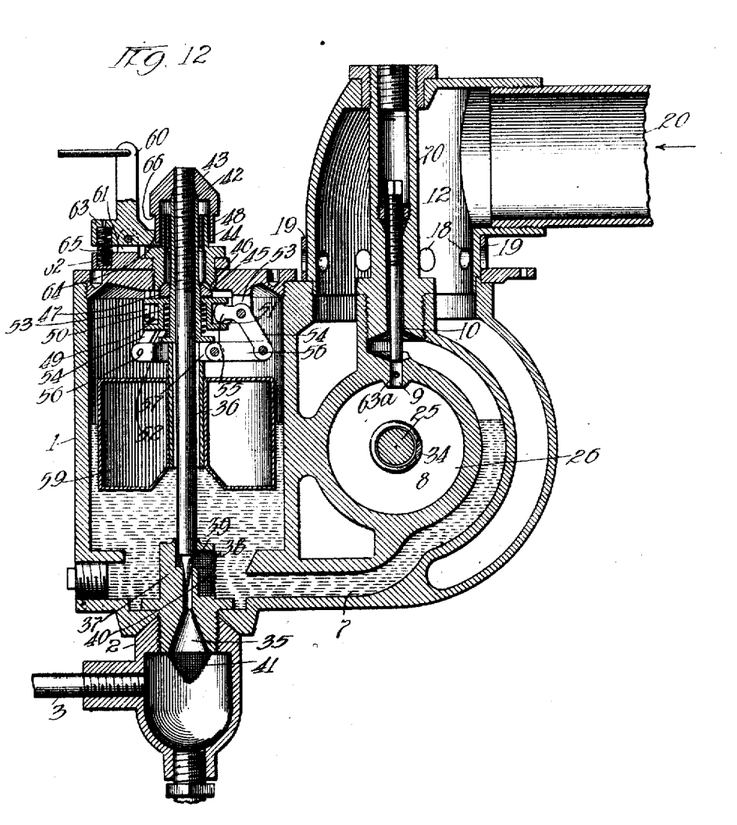

Referring again to the connection of the float chamber 1 with the supply chamber 2 it will be seen by reference to Fig. —3— that the passage 35 establishing communication between the chambers 1 and 2 is controlled by the pin-valve 36. The said passage and the valve-seat for said valve are provided in a plug 37 which is mounted in an opening in the bottom wall of the chamber 1 and enters the upper end of the chamber 2, thereby coupling said chambers. In said plug 37 is a small central opening 35 which terminates at its upper end in a lateral recess 38 and is concentric with a larger opening in the upper end of the plug which affords a guide for the stem 39 of said pin-valve 36. The mouth of the recess 38 is provided with a filtering screen 40 and a similar screen 41 is provided in the tapered inlet end of the opening 35 so that all of the liquid in the chamber 1 is strained before it enters the latter. The valve stem 36 is threaded at its upper end to receive a relatively long sleeve 42 and a cap 43 of larger diameter having an annular flange 44 into which the said sleeve 42 projects, the upper end of the latter being tapered, and the body portion of the cap 43 provided with a tapered recess so that said cap 43 may act as a lock-nut to prevent a rotation of the sleeve 42 relatively to said valve stem 36. The upper end of the chamber 1 is provided with a central opening which is closed by the hollow plug 45 having a relatively large central opening through which said sleeve 42 passes, and which is provided at its lower end with a valve seat 46 on which a valve 47 carried by the said sleeve 42 is adapted to seat. The plug 45 is provided with an upwardly extending annular flange 48 which, as shown in Figs. —3— and —7—, is provided with a plurality of longitudinal openings for the admission of air to the upper end of the chamber 1, the admission of such air being controlled by said valve 47.

The said sleeve 42 is provided at its lower end with flange 49 between which and the said valve 47 said sleeve is smooth and carries a slidable collar 50 provided with an annular groove 51. The said slidable member 50 is provided with a hub of larger internal diameter than the external diameter of the adjacent portion of the sleeve 42 to accommodate a compression spring 52 which is interposed between the flange 49 and the upper end portion of said member 50 to maintain the latter normally raised, said spring being normally under some degree of compression.

Depending from the cap or head of the chamber 1 are a plurality of bifurcated projections 53 in each of which a bell crank lever 54 is pivotally mounted; the shorter arms of said bell crank levers carrying projections 55 which engage in the annular groove 51 of said member 50.

The longer arms of said levers 54 project outwardly and downwardly at an incline from said projections and are connected at their lower ends with toggle links 56 which at their other ends are pivotally secured to projections 57 at the upper end of the tube 58 which carries the float 59 and is slidable on the valve stem 36.

It will be noted that this toggle connection with the member 50 is such that though said collar is normally maintained at the upper limit of its movement by means of said spring 52 and abuts against the valve 47, it will be seen that when the float rises to the upper limit of its movement, which is the position shown in Fig. —3—, the toggle links move the longer arms of the bell crank levers 54 outwardly and thus cause the projections 55 of the shorter arms to move said member 50 downwardly against the action of the spring 52, thereby causing the latter to bear down upon the flange at the lower end of the sleeve 42 against which the upper end of the tube 58 carrying the float 59 now abuts. Thus the pressure of the spring is exerted on the sleeve 42 which, by reason of its threaded connection with the valve stem 36, causes the valve to be forcibly held on its seat for preventing the admission of hydro-carbon liquid to the chamber 1.

Figure 1:
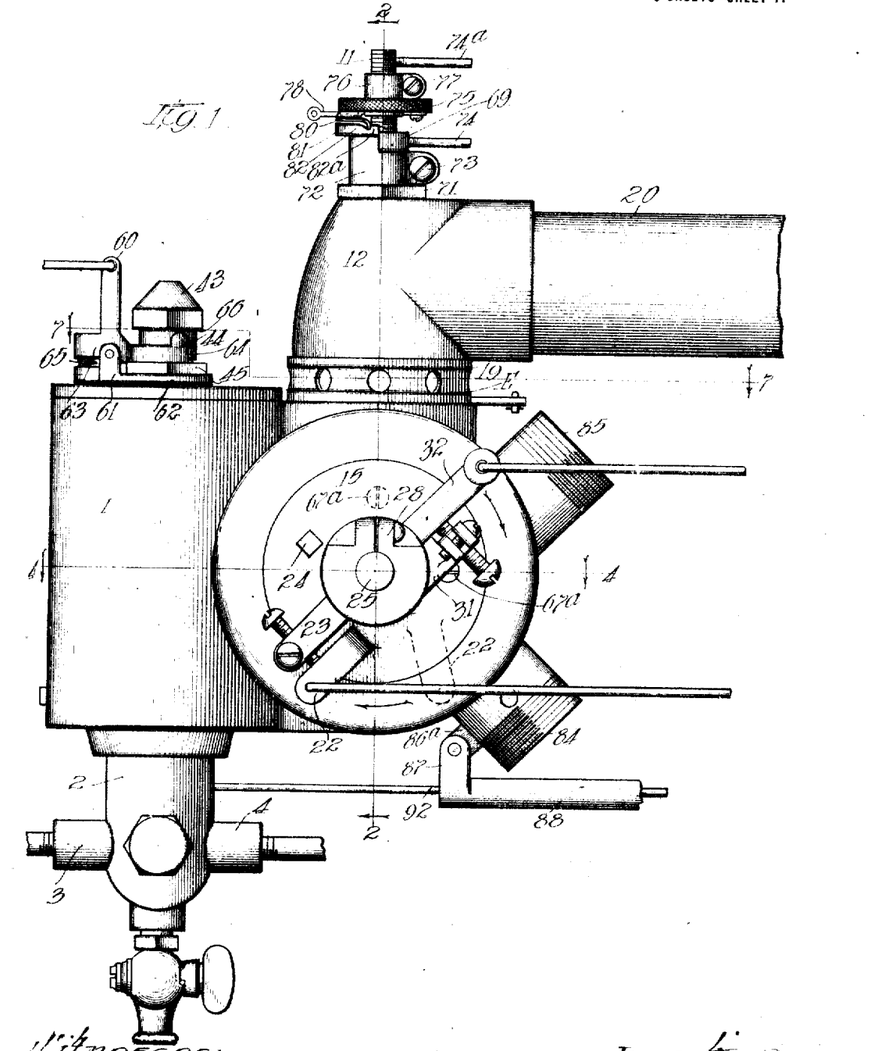
Figure 2:
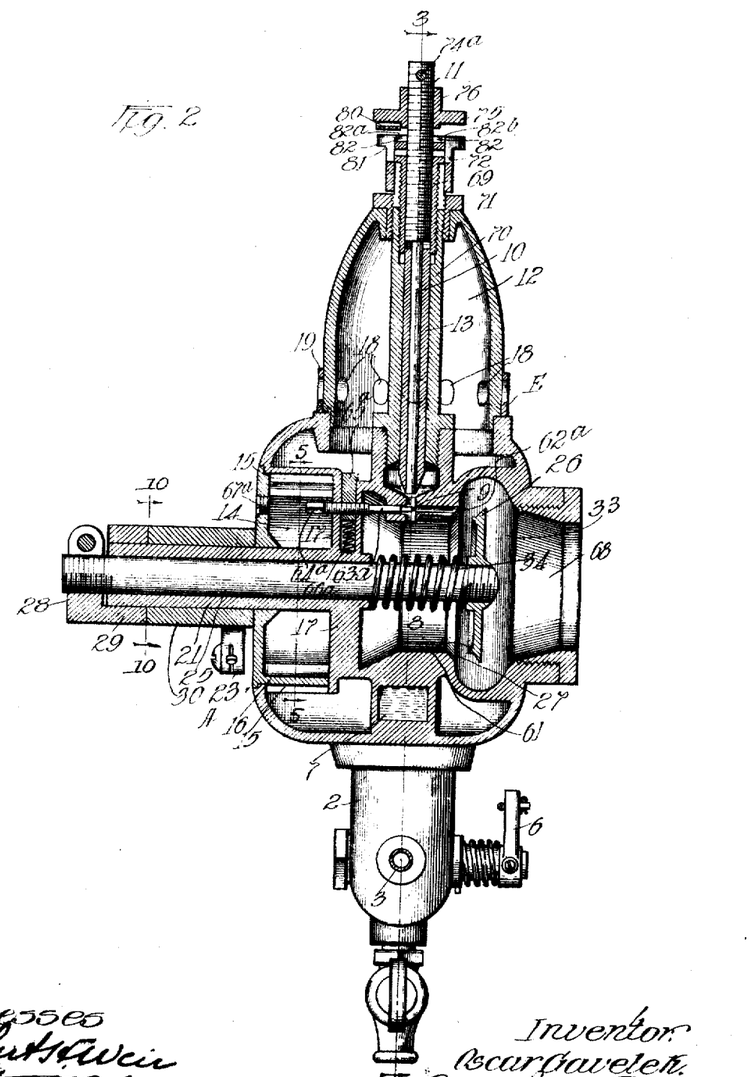

Associated with the aforesaid mechanism is a manually operable lever 60 which is pivotally mounted in a bifurcated projection 61 carried by a collar 62 mounted on the plug 45. The said lever 60 is provided at its lower end with two oppositely extending projections 63 and 64, said projection 63 being engaged by the compression spring 65 for maintaining the lever 60 normally in the position shown in Fig. —1—. The other arm 64 of said lever is forked and adapted to engage the annular shoulder 66 on the cap 43 for manually raising the valve off its seat regardless of the position of the float in the chamber 1 for the purpose of admitting a supply of hydro-carbon liquid to raise the level of the latter relatively to the elevation of the inlet port 9 to the carbureting chamber 8. As the said valve stem is raised by means of said lever 60 the said valve 47 will seat on the valve seat 46 thereby shutting off the exit of air from the chamber 1 thus preventing the rise of the level of the liquid in said chamber 1 to correspond with its level in the passage or duct 7 as will be obvious.

The toggle lever connection between the float 59 and the sleeve 49 is such that when the liquid level in the chamber 1 drops to a predetermined minimum, said sleeve 49 will be raised to entirely close the air inlet valve 47 thus cutting off the exit of air from said chamber. This, of course, also maintains the valve 39 open to its maximum extent and causes the vacuum of the intake manifold to be communicated directly to the main supply of hydro-carbon and causes a free flow of the latter through the chamber 1 without affecting the level therein unless the influx is greater than the discharge which would result only from decrease of the motor-speed.

As the motor slows down by reason of manipulation of air-valves the consumption of hydro-carbon decreases as does also the degree of vacuum. But the supply of hydro-carbon being still plentiful, the resulting carbureted air will be richer, this being obviously necessary as speed decreases to secure maximum efficiency.

The float and air valve 47 thus become regulating media for the carburation in the mixing chamber, acting automatically in combination with the air valves to adjust the hydro-carbon feed to maintain the carbureted air always approximately as rich in carbon as the varying motor speeds require.

The previously described mechanism controls the supply of hydro-carbon liquid to the carbureting chamber to some extent, such supply being obviously also dependent to a large extent upon the degree of vacuum maintained in said carbureting chamber. This is dependent primarily upon the speed of the motor and the position of the valve controlling the supply of air to the carbureting chamber. The said air supply is, as previously pointed out, controlled by the valve 14 which is manually operable as previously described, and is further controlled by the position of the valve 26 which is also manually operable and spring-held; this being accomplished by means of the collar 28 with its cam projections 29 and the cam surfaces which coact by relative rotation in one direction to effect closure of said valve 26 and in the other direction to open the same. The extent to which said valve 26 opens determines, of course, the volume of carbureted air admitted to the intake manifold of the motor. Said valve is, as shown, provided with a tapered face adapted to seat upon a tapered valve seat 27, and is provided concentric with said tapered face with an annular flange 61 which is adapted to fit telescopically within the cylindrical wall of the carbureting chamber 8 so as to nearly but not quite shut off the passage of air while maintaining a small free annular space between said valve seat 27 and the opposed seating surface of said valve 26. It will be seen that from the port 9 there is a lateral passage 62ª which connects with this said annular space and that said port is controlled by a pin valve 63ª which is threaded in one of the spokes 17, and is adapted to be rotated by means of a key adapted to engage the polygonal head 64ª thereof. In order to prevent accidental rotation and disadjustment of said valve 63ª the spoke through which the same passes is provided with a longitudinal bore in which is mounted a reciprocable plunger 65ª having an opening between its ends through which the threaded portion of the valve 63ª passes freely; said plunger being held at the outer limit of its movement by means of a compression spring 66ª whereby the same is caused to bear with sufficient force on the threaded portion of the valve 63ª to hold the same firmly against accidental rotation. Access is had to the said polygonal head 64ª of said valve 63ª through an opening in the outer wall of the air valve 14 which is maintained normally closed by means of the screw plug 67ª and which is positioned opposite said head 64ª when the valve is closed. The said valve 63ª determines the maximum supply of hydrocarbon fed when the vacuum in the chamber 68 and intake manifold of the motor exceeds the vacuum in the chamber 8 as then the hydro-carbon will obviously be deflected from the passage 9 into the passage 62ª and will become admixed with air in the chamber 68 and intake instead of in the carbureting chamber 8, the latter then constituting merely an air duct. These conditions exist in starting the motor and also in running the same at a low rate of speed. But when the valve 26 is sufficiently open to permit free passage of air into the chamber 68 the flow of hydro-carbon will be practically only through the port 9 directly into the chamber 8.

This arrangement constitutes an essential feature of the invention as it prevents choking of the motor by a superabundance of hydro-carbon being admitted in proportion to the volume of air.

It is obviously not essential that the valve 14 should be fluid-tight for the reason that a slight leakage would not be at all detrimental.

In starting the motor this valve will be only very slightly opened so that a relatively high degree of vacuum will be communicated thereto from the intake manifold upon cranking the motor and obviously if the throttle valve 26 is similarly only slightly opened this vacuum would cause a very strong current of air through the passage 62ª and as the air passing through the latter opposes the flow of hydro-carbon through the port 9, said flow will be deflected to pass with the air through the port 62ª directly into the chamber 68 and in the path of the air current passing through the annular space around the valve 26. By opening the valve 14 to admit a little more air than will readily pass through the opening afforded by the valve 26 when the latter is only slightly opened it will be obvious that the force of the air current into the port 9 and passage 62ª will be greater than if the valve 26 is opened to an extent readily admitting all the air which may be admitted to the chamber 8 through the valve 14. In this manner a very rich charge of carbureted air will be admitted to the motor cylinders for starting the motor and as soon as the latter has started the valves 26 and 14 will be more fully opened. When the valve 26 is opened to a greater extent than the valve 14 the flow of hydro-carbon will be into the chamber 8 and in through the passage 62ª as will be obvious so that the carburization will take place in the chambers 8 and 68.

As previously stated the port 9 is controlled by two valves 10 and 13, the former, controlling the minimum supply, and being adjustable and movable at will, and the latter controlling the maximum supply and being maintained in fixed position relatively to said port to effect a change from a supply of gasolene to a supply of kerosene, for example. The said valve 13 is provided with a hollow internally and externally threaded stem 69, the external threads engaging in the internal threads of a tube 70 extending from the top of the chamber 12 and into the internally threaded mouth of the passage 7 partially surrounding the carbureting chamber 8. Said tube is further held in fixed position by means of the plug 71 threaded thereon and entering the central opening in the upper wall of the chamber 12. As shown in Fig. —6—, the upper exposed end portion of said hollow valve stem 13 is partially surrounded by a split collar 72 integral with the plug 71 and which is adapted to be contracted by means of a set screw 73 to hold the same rigid with the plug 71, the upper end of said valve stem 13 being annularly enlarged and provided with a plurality of threaded radial openings adapted to receive the threaded end of a rod 74 by means of which said valve is adjusted from time to time upon loosening the set screw 73. Said rod 74 is removed after such adjustment has been effected and the set screw 73 tightened in order to prevent a disadjustment of said valve.

The threaded end 11 of the valve stem 10 engages in the internal threads in the valve stem 13 and is adjusted relatively to the latter by means of a rod 74ª. Mounted on said threaded portion 11 of said valve stem is a collar 75 which is held rigid therewith by means of the split nut 76 equipped with a set screw 77 for clamping the same against rotation on said stem; said collar being preferably integral with said split nut. The said collar 75 carries a flat spring 80 which bears upon the upper face of the member 72 for holding said valve 10 in either of several positions relatively to the valve 13; said spring-engaged surface of said member 72 being particularly shown in Fig. —6— as comprising a small horizontal portion 81 and two inclined portions 82 at opposite ends thereof; the latter being equipped with stop formations 82ª and 82ᵇ; said spring being adapted to engage one of said inclined surfaces when said valve 10 is positioned to control the supply of hydro-carbon liquid to the port 9 and being engaged with the other of said inclined surfaces when drawn up so that its lower end is disposed at a higher elevation than the lower end of the valve 13 thus causing the latter to control the supply of hydro-carbon liquid to said port. Said spring is equipped with a projection 78 for engaging an operating rod therewith.

Concentric with the said portion of the passage 7, which is concentric with the carbureting chamber 8, is a duct 83 communicating with an inlet port 84 for hot products of combustion and an outlet 85 for the same; said inlet port 84 being controlled by a throttle valve 86 of any suitable construction. The stem of said throttle valve is provided with a lever 86ª which is pivotally engaged with projections 87 on a sleeve 88 which is reciprocable for opening and closing said valve; said sleeve being discontinuous and the two parts thereof coupled by means of a link 89 pivotally engaged with projections 90 at the opposed ends of the several parts. At its outer end said sleeve is provided with a head 91 permitting it to be manually engaged for actuating said valve. Passing through the said sleeve 88 is a rod 92 connected at one end with a lever on the stem of the valve 5 and equipped at its other end with a ring or other suitable means for manually engaging the same, as shown at 93, whereby said rod may be reciprocated to change the position of said valve 5 to establish communication between the chamber 2 and the source of supply of either gasolene or kerosene or similar hydrocarbon liquids of different specific gravities as previously described. The said ring or similar member 93 is disposed so that when the valve 86 is opened the valve 5 cannot be otherwise positioned than to connect the kerosene supply with the chamber 2 but when said valve 86 is closed the valve 5 may be turned to connect either of the two sources of supply of hydro-carbon with the chamber 2. By means of this arrangement it will be obvious that the valve 86 may be opened at any time without operating the rod 92 if the valve 5 be turned to admit kerosene, as in Fig. 3, but that the valve 86 cannot be opened to heat the gasolene or other low gravity hydro-carbon contained in the duct 7.

In Fig. —12— I have shown the device embodied for the consumption of only one kind of hydro-carbon liquid. This construction is identical with that of Figs. —1— to —11— inclusive with the exception that the valve 5 and parts connected therewith are omitted as is also the valve 13 and the parts connected therewith. The valve 10 of this structure corresponding to the valve 10 of the other is adjusted to a fixed position by means of a key entering the hollow stem of the plug, the supply of the hydro-carbon liquid to the carbureting chamber being controlled by the degree of vacuum in the intake manifold or carbureting chamber, and by the position of the pin-valve controlling the supply of the hydro-carbon to the chamber 1.

While the operation of the carbureter will probably be readily understood from the foregoing description the same will be briefly reviewed, reference being had to Figs. —1— to —11— of the drawings.

Assuming that it is desired to start the motor, the lighter gravity hydro-carbon liquid will be employed. Thus the valve 5 will be turned to connect the chamber 2 with the supply of said lighter hydro-carbon. This will cause the float chamber 1 and passage 7 to contain such liquid.

In starting, the valve 26 will be slightly open as will also the air valve 15 so that upon cranking the motor a high degree of vacuum will be created thus causing a supply of substantially saturated carbureted air to be drawn into the intake manifold from the carbureting chamber and the chamber 68 communicating therewith, such saturated charge being adapted to become admixed with air finding its way into the motor past the pistons and the exhaust valves if such leakage occurs, or the quantity introduced may be further regulated by further opening of the valve 15 and the valve 26. Thus a rich charge is introduced into the motor cylinders and upon ignition sets the motor in motion. The air valve 15 and valve 26 are thereupon opened to a greater extent and such opening will determine more or less the speed of the motor. The degree to which the air valve 15 is opened will, of course, determine the richness of the charge of carbureted air, the same being determined obviously also by the position of the valve 26. That is to say, if the air valve 15 is open wide and the valve 26 is only partially open then the degree of vacuum in the carbureting chamber will obviously be relatively small so that the supply of hydro-carbon to the said chamber will be less in comparison to the volume of air passed therethrough. If on the contrary, the valve 26 is open wide and the air valve 15 is only partially opened the degree of vacuum will increase and the quantity of hydro-carbon fed in proportion to the volume of air will be greater. Such proportions may be at any time increased by manipulating the lever 60 to unseat the valve 36 and seat the valve 46.

The air valve 19 is maintained always closed during cold weather and is partially or wholly opened in warmer weather, it being desirable in cold weather to take a supply of air only through the pipe 20 and preferably to introduce air which has been heated by contact with the walls of the exhaust manifold to promote carburation, it being obvious, of course, that said valve 19 may be opened to admit cool air to reduce the temperature thereof if too hot.

If the motor has been in operation for a sufficient length of time to become thoroughly heated, then the supply to the carbureter may be changed from the lighter to the heavier hydro-carbon. This is done by turning the valve 5 to connect the chamber 2 with the source of supply of the heavier hydro-carbon which is the position shown in Fig. —3—, the valve 86 remaining closed for a considerable period in order that the balance of the contents of the lighter hydro-carbon contained in said chamber may be exhausted before the passage 7 is heated by the admission of hot products of combustion through the passage 83. The operator will know about the length of time required to exhaust, or practically exhaust, the balance of the supply of the lighter hydro carbon contained in the chamber 1 and the passage 7 and about the time that the same is exhausted he will open the valve 86 to heat the wall of the passage 7 to thereby heat and promote evaporation of the heavier hydro-carbon: the latter thus vaporizing readily and carbureting the air in the carbureting chamber. The motor may now continue to run on the heavier hydro-carbon; it being desirable, however, before stopping the motor to again turn the valve 5 to connect the chamber 20 to the supply of lighter hydro-carbon so that the heavier hydro-carbon may be exhausted prior to stopping the motor for any length of time in order that the heavier hydro-carbon may be exhausted and a starting charge of the lighter hydro-carbon be present in the passage 7 for the purpose of again starting the motor. In turning the valve 5 for this purpose the valve 86 is also closed thus shutting off the hot products of combustion from the passage 83.

It will be seen that in my carbureter everything is in perfect control of the operator after primary permanent adjustments have been effected; there being nothing automatic relied upon. The degree of vacuum controlling the volume of hydro-carbon fed and the supply of the latter are always in perfect control of the operator and are easily adjustable from time to time to secure the greatest motor efficiency.

The air intake 20 may, at its inlet end, be provided with two branches, one of which is so disposed as to cause air entering the same to contact with the wall of the exhaust manifold and the other of which is disposed to admit air at atmospheric temperature, and each of said branches may be controlled by throttle valves coupled to be operated in unison to cause one thereof to close as the other opens thus permitting air to be admitted through either or partly through both.

While I have illustrated my invention in its preferred embodiments it will be obvious that all variations in constructions falling within the scope of the appended claims are included therein.

I claim as my invention:

1. In a carbureter, a receptacle for liquid hydro-carbon adapted to be connected with a source of supply and communicating with a carbureting chamber, a float-actuated valve controlling an inlet for said liquid to said receptacle, a valve-controlled air inlet for said receptacle, and means for manually actuating said valves for opening said liquid inlet and closing said air inlet.

2. In a carbureter, a receptacle for liquid hydro-carbon adapted to be connected with a source of supply and communicating with a carbureting chamber, a float-actuated valve controlling an inlet for said liquid to said receptacle, a valve-controlled air inlet for said receptacle, and means for manually actuating said valves for simultaneously opening said liquid inlet and closing said air inlet.

3. In a carbureter, a receptacle for liquid hydro-carbon adapted to be connected with a source of supply and communicating with a carbureting chamber, a float-actuated valve controlling an inlet for said liquid to said receptacle, a valve-controlled air inlet for said receptacle, a valve-stem rigid with respect to both said valves, and means for manually actuating said valves for opening said liquid inlet and closing said air inlet.

4. In a carbureter, a receptacle for hydro-carbon liquid having an inlet for the latter and an air-inlet, valves controlling said respective inlets, a valve-stem common to both thereof, float actuated means associated with said valve-stem for opening the liquid inlet as the liquid level in said receptacle falls, and manually actuable means associated with said valve-stem for opening said liquid inlet and closing said air inlet.

5. In a carbureter, a receptacle for hydro-carbon liquid having an inlet for the latter and an air-inlet, valves controlling said respective inlets, a valve-stem common to both thereof, a collar on said valve-stem, a member longitudinally movable thereon, a spring interposed between said collar and member, and a float associated with the latter for imparting movement thereto against the action of said spring for causing the latter to exert pressure on said valve-stem in a direction to close the inlet for liquid.

6. In a carbureter, a receptacle for hydro-carbon liquid having an inlet for the latter and an air-inlet, valves controlling said respective inlets, a valve-stem common to both thereof, a collar on said valve-stem, a member longitudinally movable thereon, a normally inactive spring interposed between said collar and member, and a float associated with the latter for imparting movement thereto against the action of said spring for causing the latter to exert pressure on said valve-stem in a direction to close the inlet for liquid.

7. In a carbureter, a receptacle for hydro-carbon liquid having an inlet for the latter and an air-inlet, valves controlling said respective inlets, a valve-stem common to both thereof, a collar on said valve-stem, a member longitudinally movable thereon, a spring interposed between said collar and member, and a float associated with the latter for imparting movement thereto against the action of said spring for causing the latter to exert pressure on said valve-stem in a direction to close the inlet for liquid, and manually actuable means for moving said valve-stem to open the inlet for liquid and close the air inlet.

8. In a carbureter, a receptacle for liquid hydro-carbon, connected with a source of supply thereof, a carbureting chamber, a duct leading from the lower end of the former to the upper end of the latter and adapted to have maintained therein a given level of liquid, a float controlled inlet-valve for said receptacle adapted to maintain said given level of liquid therein, an air inlet to said receptacle, a valve controlling the same, and manually operable means for opening the liquid inlet and closing the air-inlet whereby to permit free passage of liquid through said receptacle into said duct to raise the liquid level in the latter without raising the same in said receptacle.

9. In a carbureter, a carbureting chamber, equipped with a valve-seat at one end, a valve seating thereon for controlling the delivery of carbureted air therefrom, an annular flange on said valve adapted to enter said carbureting chamber as said valve approaches its seat for substantially closing the discharge end of said chamber before said valve seats, a manually operable air inlet valve for said carbureting chamber, a hydro-carbon inlet-port for said chamber, and a passage connecting said port with said valve seat for deflecting the flow of hydro-carbon from said carbureting chamber.

10. In a carbureter, a carbureting chamber, a hydro-carbon supply port for the same, a sleeve-valve adapted to be adjusted to a fixed position relatively to said port to control the maximum hydro-carbon supply to said carbureting chamber, and a manually operable valve controlling the minimum hydro-carbon supply thereto, the latter telescopically and rotatably movable in the former.

11. In a carbureter, a carbureting chamber, having an inlet port for hydro-carbon, a receptacle for the latter, a passage connecting the same with said port, a plurality of sources of supply of hydro-carbons of different specific gravities communicating with said receptacle, a valve controlling all of said supplies and adapted when turned to different positions to connect one of said sources with said receptacle and shut off the remainder, a duct for hot products of combustion bordering said passage, a valve controlling said duct, means for manually operating both said valves, said means including mechanism whereby when said first-named valve is in a predetermined position the last-named valve is incapable of opening.

12. In a carbureter, a receptacle for hydrocarbon liquid having connection with a source of supply and with a carbureting chamber, a valve controlling the first-named connection, an air inlet port for said receptacle, a valve controlling the same, and a float common to both said valves for closing the air-inlet port when said valve controlling the supply of liquid to said receptacle is open to its maximum extent.

13. In a carbureter having connection with sources of supply of hydro-carbon liquids of respectively different specific gravities, a carbureting chamber, a duct for hydrocarbon liquid discharging into said carbureting chamber, a flue for hot products of combustion disposed to heat the said hydrocarbon duct, a valve controlling said flue, a valve controlling the connections of both sources of supply of hydro-carbon with said carbureter and adapted to be operated to effect connection with one thereof as the connection with the other is interrupted, and manually operable mechanism controlling both said valves for preventing opening of the first-named valve when the second one is positioned to connect the carbureter with the source of supply of the lower gravity hydro-carbon liquid while permitting closure of said flue controlling valve when the other valve is positioned to connect the float chamber with the source of higher gravity hydro-carbon.

14. In a carbureter having connection with sources of supply of hydro-carbon liquids of respectively different specific gravities, a a carbureting chamber, a duct for hydrocarbon liquid discharging into said carbureting chamber, a flue for hot products of combustion disposed to heat the said hydrocarbon duct, a valve controlling said flue, manually operable means controlling the respective connections between said carbureter and said sources of supply for shutting off one thereof as the other is opened, and manually operable means for actuating said valve controlling said flue, and operative connection between said respective manually operable means whereby opening of said valve controlling said flue is prevented except when the carbureter is connected with the source of hydro-carbon of higher specific gravity.

In testimony whereof I have signed my name in presence of two subscribing witnesses.

OSCAR GAVELEK.

Witnesses:
M. M. BOYLE,
F. P. BOWMAN.